(12) United States Patent
Ugurlu et al.

(10) Patent No.: US 11,330,506 B2
(45) Date of Patent: May 10, 2022

(54) METHOD AND APPARATUS FOR MULTIPLE BANDWIDTH PARTS OPERATION IN MOBILE COMMUNICATIONS

(71) Applicant: MediaTek Singapore Pte. Ltd., Singapore (SG)

(72) Inventors: Ahmet Umut Ugurlu, Cambridge (GB); Ju-Ya Chen, Hsinchu (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 16/447,334

(22) Filed: Jun. 20, 2019

(65) Prior Publication Data

US 2019/0394710 A1 Dec. 26, 2019

Related U.S. Application Data

(60) Provisional application No. 62/687,857, filed on Jun. 21, 2018.

(51) Int. Cl.
| | |
|---|---|
| *H04W 48/12* | (2009.01) |
| *H04L 5/00* | (2006.01) |
| *H04W 8/24* | (2009.01) |
| *H04L 27/26* | (2006.01) |
| *H04W 72/04* | (2009.01) |

(52) U.S. Cl.
CPC ............ *H04W 48/12* (2013.01); *H04L 5/0098* (2013.01); *H04L 27/2607* (2013.01); *H04W 8/24* (2013.01); *H04W 72/0453* (2013.01)

(58) Field of Classification Search
CPC ... H04W 48/12; H04W 8/24; H04W 72/0453; H04L 5/0098; H04L 27/2607

USPC .......................................................... 370/329
See application file for complete search history.

(56) References Cited

U.S. PATENT DOCUMENTS

| | | | |
|---|---|---|---|
| 2018/0139778 A1 | 5/2018 | Chou et al. | |
| 2019/0132109 A1* | 5/2019 | Zhou | H04W 72/042 |
| 2019/0141734 A1* | 5/2019 | Lei | H04W 72/1289 |
| 2019/0357300 A1* | 11/2019 | Zhou | H04W 72/0446 |
| 2020/0077432 A1* | 3/2020 | Xiong | H04L 1/1825 |

FOREIGN PATENT DOCUMENTS

| | | | | |
|---|---|---|---|---|
| CN | 102263583 A | | 11/2011 | |
| WO | WO-2019117619 A1 * | | 6/2019 | H04B 1/7143 |

OTHER PUBLICATIONS

U.S. Appl. No. 62/520,878, filed 2017.*

(Continued)

*Primary Examiner* — Yemane Mesfin
*Assistant Examiner* — Intekhaab A Siddiquee
(74) *Attorney, Agent, or Firm* — Han IP PLLC; Andy M. Han

(57) ABSTRACT

Various solutions for multiple active bandwidth parts (BWPs) operation with respect to user equipment and network apparatus in mobile communications are described. An apparatus may receive a configuration of a plurality of BWPs. The apparatus may determine whether a restriction is configured. The apparatus may activate the plurality of BWPs on a same carrier according to the restriction. The apparatus may perform a transmission or reception on at least one of a plurality of activated BWPs.

20 Claims, 9 Drawing Sheets

(56) References Cited

OTHER PUBLICATIONS

U.S. Appl. No. 62/519,705, filed 2017.*
U.S. Appl. No. 62/518,848, filed 2017.*
62581199P (Year: 2017).*
62672096P (Year: 2017).*
62671732P (Year: 2017).*
62577239P (Year: 2017).*
62597866P (Year: 2020).*
Taiwan Intellectual Property Office, Office Action for Taiwan Patent Application No. 108121680, dated May 5, 2020.
Catt, Further details on NR 4-step RA Procedure, 3GPP TSG RAN WG1 Meeting #92, R1-1801712, Feb. 17, 2018.
China National Intellectual Property Administration, International Search Report and Written Opinion for International Patent Application No. PCT/CN2019/092299, dated Aug. 27, 2019.
Catt, Further details on NR 4-step RA Procedure, 3GPP TSG RAN WG1 #92, R1-1801712, Athens, Greece, Feb. 26-Mar. 2, 2018.

* cited by examiner

METHOD AND APPARATUS FOR MULTIPLE BANDWIDTH PARTS OPERATION IN MOBILE COMMUNICATIONS

CROSS REFERENCE TO RELATED PATENT APPLICATION(S)

The present disclosure is part of a non-provisional application claiming the priority benefit of U.S. Patent Application No. 62/687,857, filed on 21 Jun. 2018, the content of which is incorporated by reference in its entirety.

TECHNICAL FIELD

The present disclosure is generally related to mobile communications and, more particularly, to multiple active bandwidth parts (BWPs) operation with respect to user equipment and network apparatus in mobile communications.

BACKGROUND

Unless otherwise indicated herein, approaches described in this section are not prior art to the claims listed below and are not admitted as prior art by inclusion in this section.

In New Radio (NR), ultra-reliable and low latency communications (URLLC) is supported for emerging applications that demands high requirements on end-to-end latency and reliability. A general URLLC reliability requirement is that a packet of size 32 bytes shall be transmitted within 1 millisecond end-to-end latency with a success probability of $10^{-5}$. URLLC traffic is typically sporadic and short whereas low-latency and high-reliability requirements are stringent. For example, the control reliability of URLLC has to be stricter than the data reliability which is up to $10^{-6}$ block error rate (BLER).

In addition, the concept of BWP is introduced to achieve better frequency spectrum efficiency and reduce user equipment (UE) power consumption. Carrier BWP is a contiguous set of physical resource blocks selected from a contiguous subset of the common resource blocks for a given numerology on a given carrier. The UE does not need to turn on its radio frequency (RF) transceiver for a wide frequency range. Instead, the UE can only perform a transmission within a specific BWP and turn off its RF transceiver in other frequency range. Thus, the UE power consumption can be reduced. In current NR, a UE can be configured with up to 4 BWPs per serving cell with only one BWP being active at any given time.

However, simultaneous support of more than one active BWPs in a serving cell may be needed as a measure to improve spectrum management and carrier aggregation operation from system point of view. Spectrum efficiency can be achieved by better frequency-domain resource assignment and/or control signalling overhead reduction. Another potential benefit for multiple active BWPs can be multiple numerology support for service-specific optimization. For example, URLLC type services require higher reliability and latency than eMBB services. Higher numerologies may be associated with shorter symbol length whereas lower numerologies may provide better cell-edge reliability. Despite many potential benefits, UE support of multiple BWPs may require higher implementation complexity and greater hardware cost, as well as processing power. Support of multiple active BWPs may have significant impact on UE transmission and reception operations.

Accordingly, how to support multiple active BWPs and also simplify UE implementation design may become an important issue in the newly developed wireless communication network. Therefore, it is needed to provide proper schemes for supporting multiple active BWPs operation.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to multiple active BWPs operation with respect to user equipment and network apparatus in mobile communications.

In one aspect, a method may involve an apparatus receiving a configuration of a plurality of BWPs. The method may also involve the apparatus determining whether a restriction is configured. The method may further involve the apparatus activating the plurality of BWPs on a same carrier according to the restriction. The method may further involve the apparatus performing a transmission or reception on at least one of a plurality of activated BWPs.

In one aspect, an apparatus may comprise a transceiver capable of wirelessly communicating with a network node of a wireless network. The apparatus may also comprise a processor communicatively coupled to the transceiver. The processor may be capable of receiving, via the transceiver, a configuration of a plurality of BWPs. The processor may also be capable of determining whether a restriction is configured. The processor may further be capable of activating the plurality of BWPs on a same carrier according to the restriction. The processor may further be capable of performing, via the transceiver, a transmission or reception on at least one of a plurality of activated BWPs.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT) and Narrow Band Internet of Things (NB-IoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to multiple active BWPs operation with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

In NR, the concept of BWP is introduced to achieve better frequency spectrum efficiency and reduce UE power consumption. Carrier BWP is a contiguous set of physical resource blocks selected from a contiguous subset of the common resource blocks for a given numerology on a given carrier. The UE does not need to turn on its RF transceiver for a wide frequency range. Instead, the UE can only perform a transmission within a specific BWP and turn off its RF transceiver in other frequency range. Thus, the UE power consumption can be reduced. In current NR, a UE can be configured with up to 4 BWPs per serving cell with only one BWP being active at any given time.

However, simultaneous support of more than one active BWPs in a serving cell may be needed as a measure to improve spectrum management and carrier aggregation operation from system point of view. Spectrum efficiency can be achieved by better frequency-domain resource assignment and/or control signalling overhead reduction. Another potential benefit for multiple active BWPs can be multiple numerology support for service-specific optimization. For example, URLLC type services require higher reliability and latency than eMBB services. Higher numerologies may be associated with shorter symbol length whereas lower numerologies may provide better cell-edge reliability. Despite many potential benefits, UE support of multiple BWPs may require higher implementation complexity and greater hardware cost, as well as processing power. Support of multiple active BWPs may have significant impact on UE transmission and reception operations.

Figure 1:
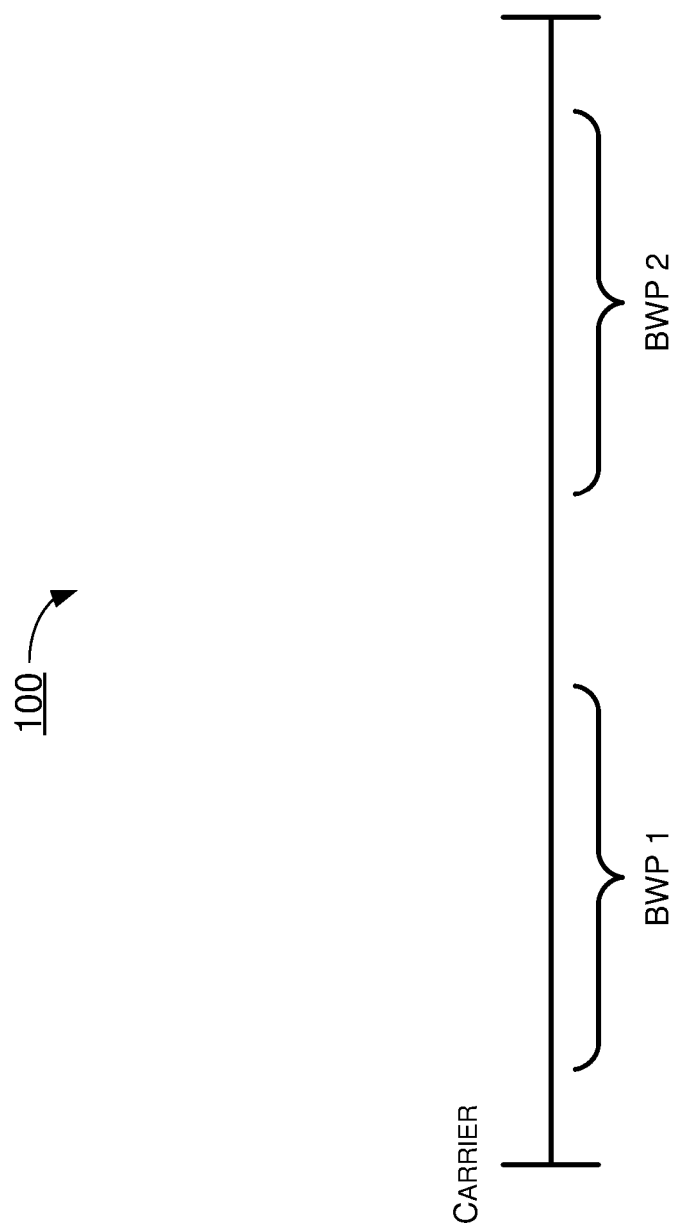
FIG. 1 is a diagram depicting an example scenario under schemes in accordance with implementations of the present disclosure.

Multiple active BWPs may comprise different scenarios as illustrated in the present disclosure. FIG. 1 illustrates an example scenario 100 under schemes in accordance with implementations of the present disclosure. Scenario 100 involves a UE and a network node, which may be a part of a wireless communication network (e.g., an LTE network, an LTE-Advanced network, an LTE-Advanced Pro network, a 5G network, an NR network, an IoT network or an NB-IoT network). Scenario 100 illustrates multiple simultaneous active BWPs per serving cell with non-overlapping resource blocks (RBs) in frequency domain. The first active BWP (e.g., BWP 1) is not overlapped with the second active BWP (e.g., BWP 2) in frequency domain. Each active BWP may or may not share the same numerology.

Figure 2:
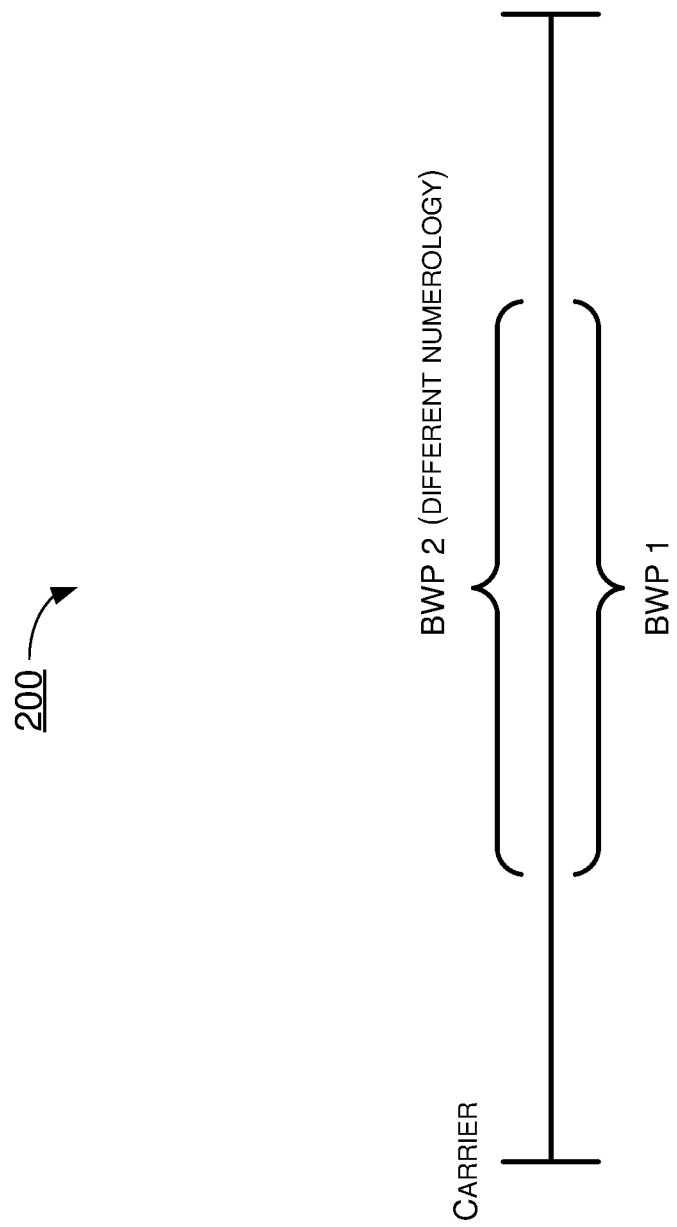
FIG. 2 is a diagram depicting an example scenario under schemes in accordance with implementations of the present disclosure.

FIG. 2 illustrates an example scenario 200 under schemes in accordance with implementations of the present disclosure. Scenario 200 involves a UE and a network node, which may be a part of a wireless communication network (e.g., an LTE network, an LTE-Advanced network, an LTE-Advanced Pro network, a 5G network, an NR network, an IoT network or an NB-IoT network). Scenario 200 illustrates multiple simultaneous active BWPs per serving cell with fully overlapping RBs in frequency domain. The first active BWP (e.g., BWP 1) is fully overlapped with the second active BWP (e.g., BWP 2) in frequency domain. All active BWPs may be assigned with a different numerology.

Figure 3:
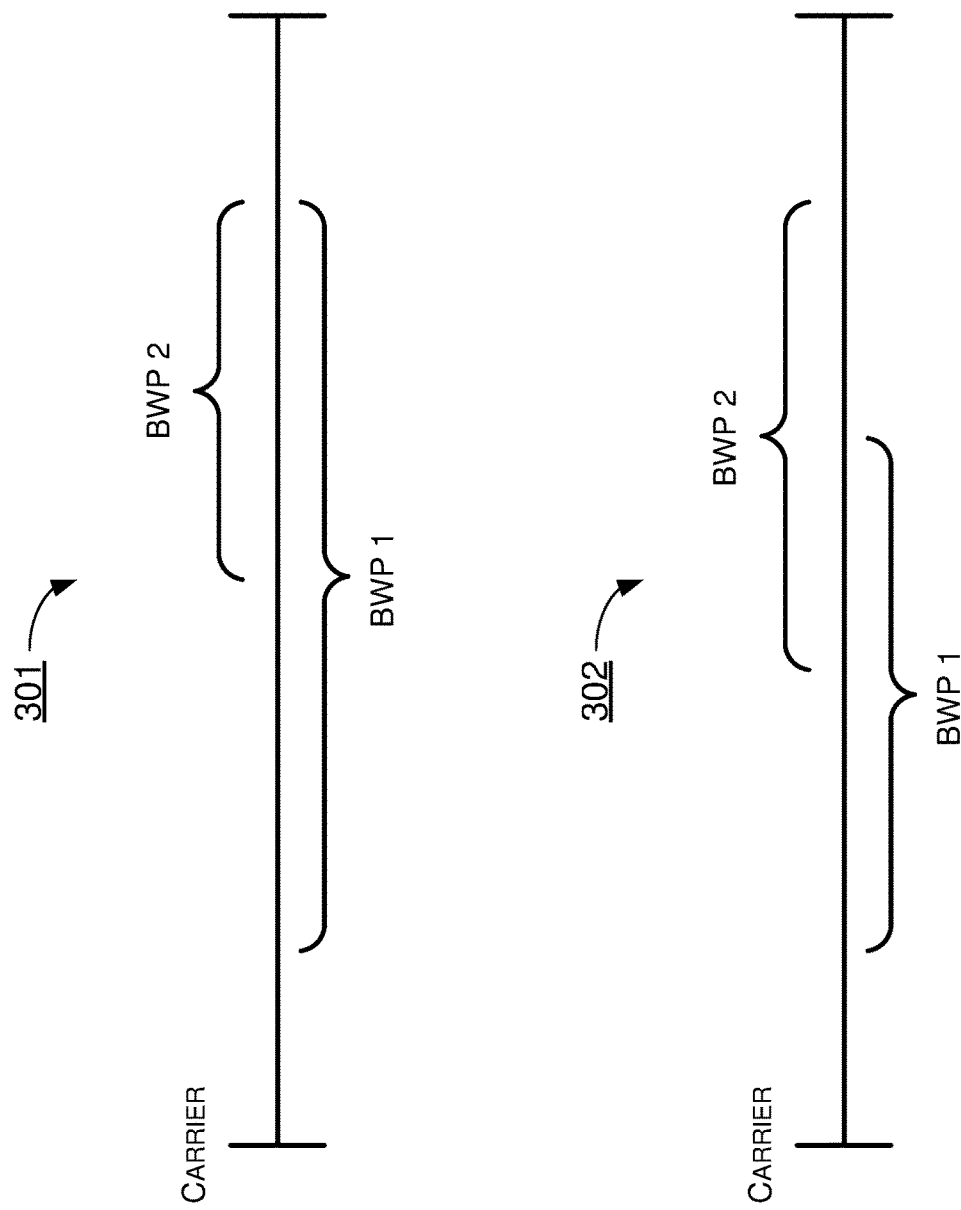
FIG. 3 is a diagram depicting example scenarios under schemes in accordance with implementations of the present disclosure.

FIG. 3 illustrates example scenarios 301 and 302 under schemes in accordance with implementations of the present disclosure. Each of scenarios 301 and 302 involves a UE and a network node, which may be a part of a wireless communication network (e.g., an LTE network, an LTE-Advanced network, an LTE-Advanced Pro network, a 5G network, an NR network, an IoT network or an NB-IoT network). Scenarios 301 and 302 illustrate multiple simultaneous active BWPs per serving cell with partially overlapping RBs in frequency domain. The first active BWP (e.g., BWP 1) and the second active BWP (e.g., BWP 2) may be partially overlapped in frequency domain. Each active BWP may or may not share the same numerology. The above scenarios 100, 200, 301 and 302 are illustrated with 2 active BWPs in the figures. However, it should be noted that the same definition may be applied to any number of active BWPs (e.g., more than 2 active BWPs).

To support multiple active BWPs, more capable RF hardware will be required with non-overlapping and partially-overlapping BWPs. For example, either wider bandwidth or multiple RF filters will be needed. Therefore, higher device cost in UE implementation will be required.

On the other hand, higher implementation complexity will be necessary to simultaneously support different numerologies. Simultaneous operation will require more processing power. Thus, more power consumption at UE side will be inevitable. Accordingly, it is important to minimize these negative impacts on UE to reduce costs for widespread adoption of NR. It is also important to ensure better UE power efficiency in NR.

In view of the above, the present disclosure proposes a number of schemes pertaining to multiple active BWPs operation with respect to the UE and the network apparatus. According to the schemes of the present disclosure, the UE may be able to support multiple active BWPs. Some restrictions may be configured. The UE may be configured to support multiple active BWPs according to the restrictions. Accordingly, UE implementation requirements and design complexity may be relaxed. The power efficiency of the UE may also be improved.

Specifically, the UE may be configured to receive a configuration of a plurality of BWPs. The configuration may be received from a network node. The UE may determine whether a restriction is configured. The UE may be configured to activate the plurality of BWPs on a same carrier according to the restriction. The UE may perform a transmission or reception on at least one of a plurality of activated BWPs. The restriction may be specified in $3^{rd}$ Generation Partnership Project (3GPP) specifications, pre-configured in the UE, or configured via a higher layer signaling (e.g., radio resource control (RRC) signaling) and/or a physical layer signaling (e.g., DCI) from the network node. In the present disclosure, the active BWP means that the UE may be able to transmit/receive data packets, transmit/receive control information, transmit/receive reference signalling, or monitor/measure any other signalling via the BWP. The plurality of BWPs may comprise 2 or more BWPs, or only one active BWP as long as the definition of BWP is extended to support multiple numerologies. For example, in an event that the UE is configured with one active BWP that may simultaneously support multiple numerologies, the plurality of BWPs described in the present disclosure may also be applicable in such case. The plurality of BWPs may be configured corresponding to a given serving cell or different serving cells.

In some implementations, the restriction may comprise a restricted number of active BWPs. The UE may be configured to activate the restricted number of the plurality of BWPs. Specifically, an integer-valued maximum number of active BWPs may be defined as the restricted number of active BWPs among the plurality of BWPs for a serving cell. The UE may be not expected to be configured with more than the restricted number (e.g., X number) of active BWPs per cell. The UE may be configured to activate up to a limited X number of active BWPs. The integer-valued X may be a fixed value (e.g., X=2), or may be determined based on a UE capability. Either of these options may be applicable to all carriers or, alternatively, either of the options may be defined specifically for some of the carriers. For example, the value of X may be 1 for frequency range 1 (FR1) bands whereas it may be 2 for frequency range 1 (FR2) bands in NR. The UE may be configured to activate 1 BWP when operating in FR1 bands and activate 2 BWPs when operating in FR2 bands. In an event that X is determined based on the UE capability, multiple X values may be configured per UE. For example, there may be a baseline X value (e.g., X=2) and another aggressive X value (e.g., X=4).

In some implementations, the restriction may comprise a restricted carrier. The restricted carrier may comprise at least one of an uplink carrier, a downlink carrier, a supplementary uplink carrier, and a supplementary downlink carrier. The UE may be configured to activate the plurality of BWPs in the restricted carrier. Specifically, multiple active BWPs may be configured for only downlink or for only uplink. For example, in an event that there is a supplementary uplink (SUL) configured in uplink, multiple active BWPs may be configured only for downlink. The UE is not expected to be configured with more than X number of active downlink BWPs per cell. In another example, multiple active BWPs may only be configured in uplink for reliable cell-edge operation. Cell coverage is well known to be limited in uplink due to transmission power limitations. Cell-edge reliability may be improved with lower numerology due to delay spread. In addition, the configuration of downlink-only multiple active BWPs or uplink-only multiple active BWPs may be determined according to a UE capability. The UE may report its capability for supporting downlink-only multiple active BWPs and/or uplink-only multiple active BWPs. The UE may be configured to transmit a UE capability signalling to the network node during the initial access procedure.

In some implementations, the restriction may comprise that mixed numerologies among BWPs are not allowed. The UE may be configured to activate no BWPs. Specifically, the configuration of multiple BWPs with mixed numerologies may be not allowed in an event that multiple BWPs are non-overlapping in frequency (e.g., scenario 100). Mixed numerologies among BWPs means that the numerologies of different BWPs are different. The UE may be configured to determine whether the numerologies of different BWPs are different. In an event that the mixed numerologies between multiple BWPs are detected by the UE, the UE may be configured not to activate the multiple BWPs or activate only one of the multiple BWPs. For example, simultaneous transmission and/or reception is not allowed between BWPs in an event that they are associated with different numerologies. Alternatively, the UE may be configured to report its capability for not supporting mixed numerologies. In an event that mixed numerologies among BWPs is configured, the UE may be configured to ignore the configuration.

In some implementations, the restriction may comprise that mixed numerologies among BWPs are allowed with a limitation. The UE may be configured to activate the plurality of BWPs according to the limitation. Specifically, the limitation may comprise that only certain combinations of different numerologies can be supported. For example, only multiple numerologies with one degree of difference may be supported. In an example embodiment, numerologies with 15 KHz and 30 KHz subcarrier spacing (i.e., 1-degree difference) may be supported whereas numerologies with 15 KHz and 60 KHz subcarrier spacing (i.e., 2-degree difference) may not be supported.

In some implementations, in an event that UE is configured with multiple BWPs of different numerologies with overlapping frequency-domain resources, UE processing timeline may be relaxed. One approach is to use the same timeline parameters/rules (e.g., N1 or N2 processing time) and consider the lower numerology as the reference. In other words, processing timeline may be based on the lower numerology (e.g., with the greater symbol length). Alternative approach is to increase the timeline parameters by a fixed amount. For example, effective N1 may be reconfigured as N1'=N1+X where X refers to the number of simultaneously configured active BWPs. These two approaches may also be combined together.

In some implementations, support for different numerologies between simultaneously active BWPs may depend on UE capability. The UE may be configured to determine whether to activate the plurality of BWPs according to a UE capability. For example, any combination of different numerologies may not be supported as a capability. Only some combinations of different numerologies may be supported. The UE may be configured to report its capability for supporting specific combinations of different numerologies.

In some implementations, the restriction may comprise that no simultaneous transmission or reception on the plurality of BWPs is allowed. The UE may be configured to perform the transmission or reception on one of a plurality of activated BWPs. Specifically, a use case for multiple active BWP may be fast switch between numerologies. In an event that only one active BWP is allowed, BWP switch process requires a delay during UE reconfiguration. This is undesirable for latency-sensitive traffic (e.g., URLLC) as the UE is temporarily unable to perform transmission or reception during reconfiguration. Such limitation may be overcome while multiple active BWPs are supported. However, it is still desirable to define some limitations in order to simplify UE implementation and to maintain power efficiency. For example, no simultaneous transmission/reception may be expected on different uplink/downlink BWPs from UE. Simultaneous transmission/reception refers to overlapping resources in time-domain including frequency-domain multiplexing. The UE may be configured to perform transmission/reception on one of the plurality of active BWPs.

In some implementations, switching from one BWP to another BWP for a transmission or reception is allowed as long as the switching duration is not shorter than a guard period. Specifically, the UE may be configured to determine whether the switching duration from a first BWP to a second BWP is not shorter than a guard period. After determining that the switching duration is not shorter than the guard period, the UE may be configured to perform a switch from the first BWP to the second BWP. The guard period may be determined based on UE capability. The UE may be configured to report its capability for the supported guard period.

Figure 4:
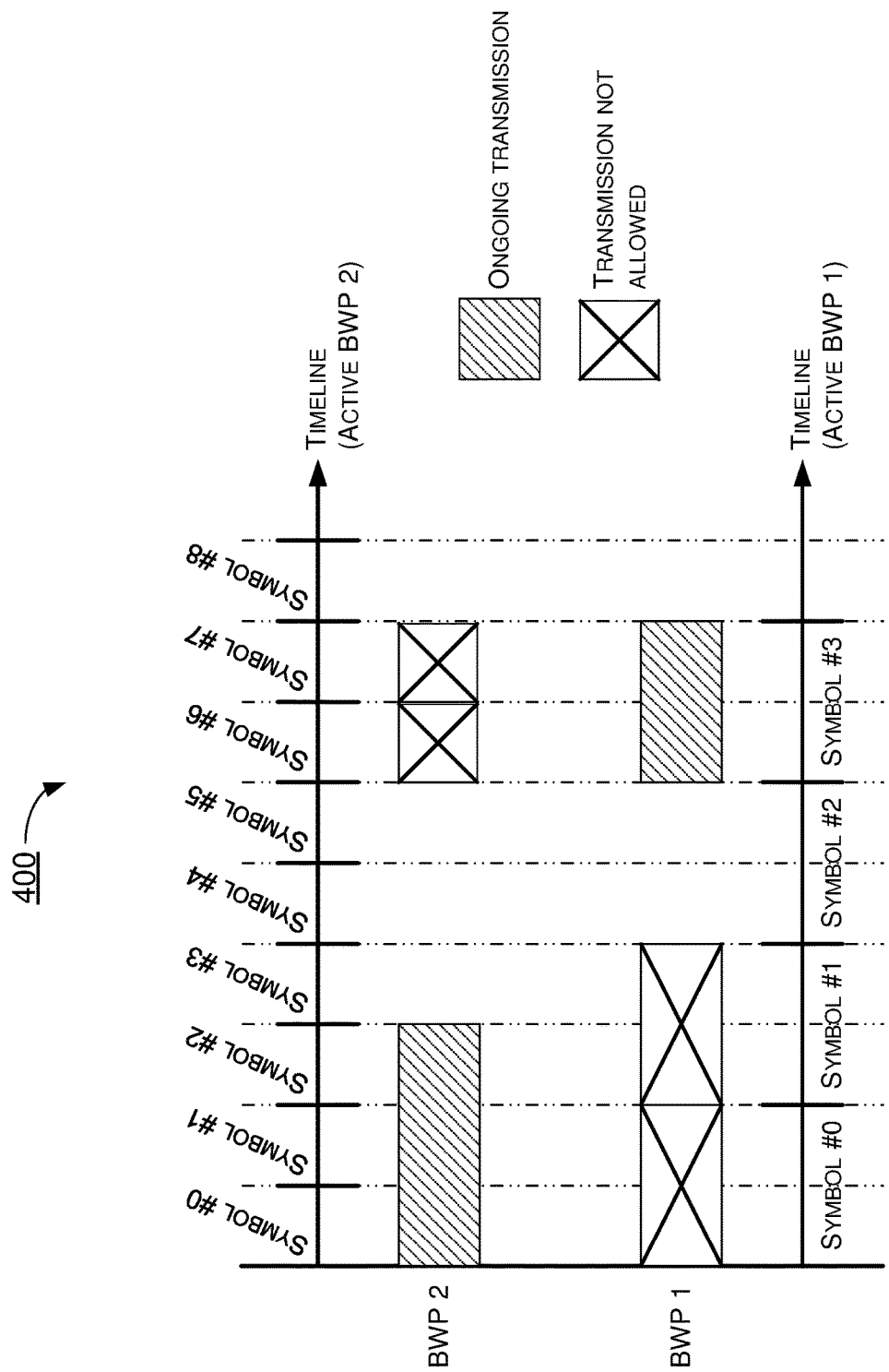
FIG. 4 is a diagram depicting an example scenario under schemes in accordance with implementations of the present disclosure.

FIG. 4 illustrates an example scenario 400 under schemes in accordance with implementations of the present disclosure. Scenario 400 involves a UE and a network node, which may be a part of a wireless communication network (e.g., an LTE network, an LTE-Advanced network, an LTE-Advanced Pro network, a 5G network, an NR network, an IoT network or an NB-IoT network). The UE may be configured with two active BWPs (e.g., active BWP 1 and active BWP 2). Active BWP 1 and active BWP 2 may have different numerologies. In scenario 400, no simultaneous transmission or reception (e.g., uplink or downlink transmission/reception) is allowed on different BWPs for the UE. For example, the UE may be configured with a transmission/reception in symbol #0-symbol #1 of active BWP 1 and a transmission/reception in symbol #0-symbol #2 of active BWP 2. These two transmissions/receptions may be overlapped in part in time domain. Since no simultaneous transmission/reception is allowed, the UE may be configured to cancel the transmission/reception in symbol #0-symbol #1 of active BWP 1 and perform the transmission/reception in symbol #0-symbol #2. Similarly, when the UE is configured with two overlapped transmissions/receptions (e.g., symbol #3 of active BWP 1 and symbol #6-symbol #7 of active BWP 2), the UE may be configured to perform one of them and cancel the other one.

Figure 5:
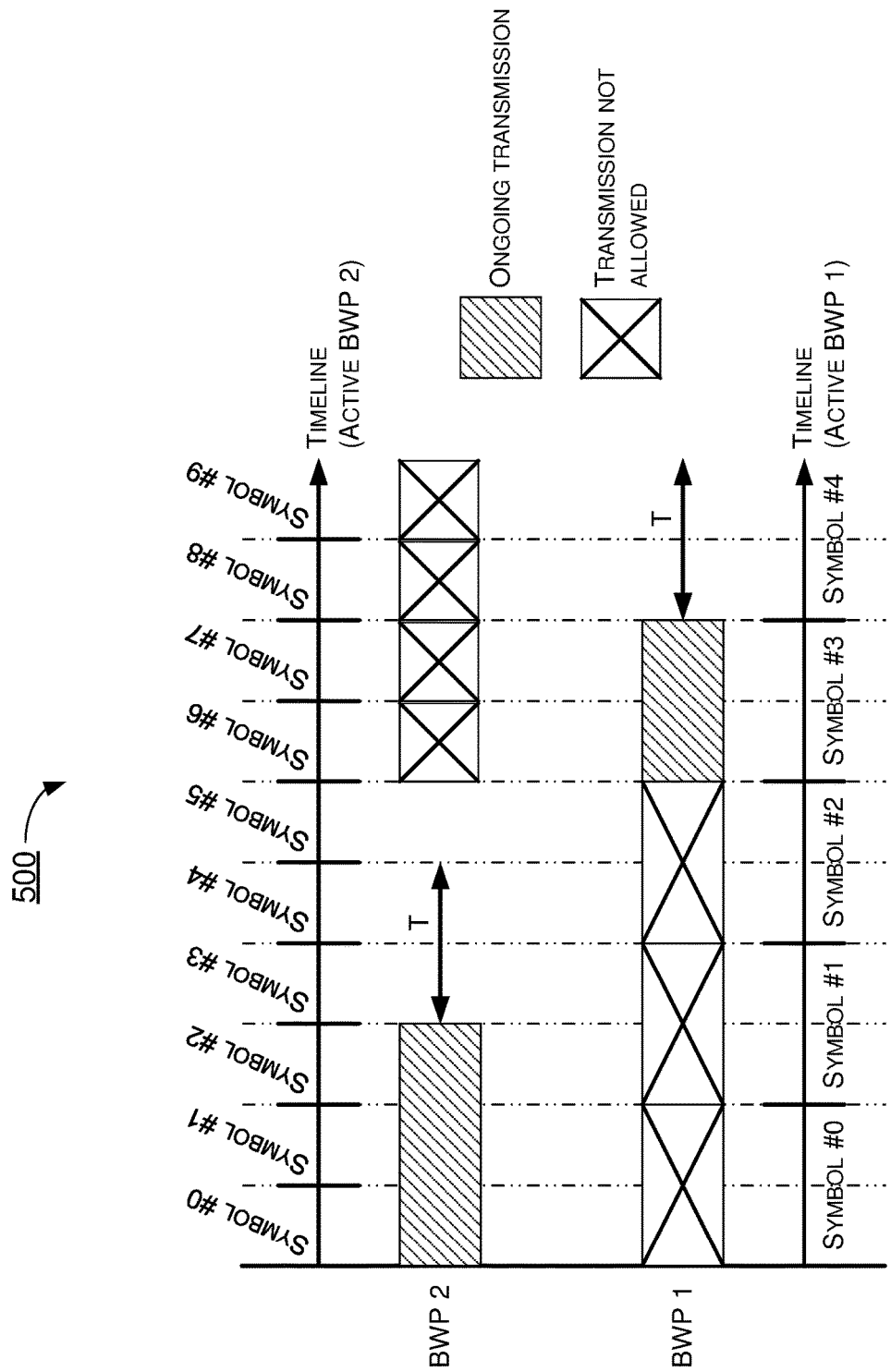
FIG. 5 is a diagram depicting an example scenario under schemes in accordance with implementations of the present disclosure.

In some implementations, a minimum timing requirement (e.g., T) for switching between two active BWPs may be introduced to reduce UE complexity. The timing requirement T may be defined in terms of number of symbols. T may be shorter than the timing requirement for switching from an active BWP to an inactive BWP. For example, the baseline value may be considered as 2 milliseconds. Multiple values may be defined for T depending on the relationship between active BWPs (e.g., different scenarios as described above). FIG. 5 illustrates an example scenario 500 under schemes in accordance with implementations of the present disclosure. Scenario 500 involves a UE and a network node, which may be a part of a wireless communication network (e.g., an LTE network, an LTE-Advanced network, an LTE-Advanced Pro network, a 5G network, an NR network, an IoT network or an NB-IoT network). After performing the transmission/reception in symbol #0-symbol #2 of active BWP 2, the UE may need the timing requirement T to switch to active BWP 1. No transmission/reception is allowed in symbol #2 of BWP-1 because of T. Thus, the UE may be configured to further cancel the transmission/reception overlapped with the timing requirement T (e.g., symbol #2 of active BWP 1). Similarly, after performing the transmission/reception in symbol #3 of active BWP 1, the UE may need the timing requirement T to switch to active BWP 2. No transmission/reception is allowed in symbol #8-symbol #9 of BWP-2 because of T. Thus, the UE may be configured to further cancel the transmission/reception overlapped with the timing requirement T (e.g., symbol #4 of active BWP 1).

In some implementations, the UE may be configured to initiate an inactivity timer associated with at least one of the plurality of BWPs. The UE may be configured to deactivate at least one of the plurality of BWPs when the inactivity timer is expired. Specifically, a BWP may be associated with a BWP inactivity timer. One of the active BWPs may be determined as a primary BWP with an inactivity timer whereas the other BWPs may not be assigned a timer. When the timer is expired, all of the active BWPs may be deactivated, and the UE may switch to the initial BWP. For example, the UE may be configured with two active BWPs (e.g., BWP 1 and BWP 2). BWP 1 may be assigned an inactivity timer (i.e., BWP 1 may be considered as the primary BWP). In an event that there is no transmission/reception or reception on BWP 1 for a period of time, the inactivity timer may be triggered, and the UE may be configured to deactivate both BWPs and activate the initial BWP. In another example, the UE may be configured not to transmit or receive data on all active BWPs other than the primary BWP (e.g., the BWP which is assigned an inactivity timer). When the inactivity timer is expired, the UE may only perform the transmission/reception on the primary BWP.

In some implementations, each of the active BWP may be assigned with a different BWP inactivity timer. When one of the inactivity timers is expired, only the corresponding active BWP may be deactivated and then the UE may activate the initial BWP. Specifically, the UE may be configured to activate the initial BWP only when there are no other active BWPs. For example, the UE may be configured with 2 active BWPs (e.g., BWP 1 and BWP 2). Neither of these BWPs is the initial BWP. When BWP 1 is deactivated according to the expiry of its timer, the UE is not expected to activate the initial BWP since another BWP (e.g., BWP 2) is still active. Then, when the timer corresponding to BWP 2 is also expired, the UE may deactivate BWP 2. Since no other active BWP is left, the UE may be configured to activate the initial BWP. Alternatively, the UE may be configured to activate the initial BWP as long as at least one of the active BWPs is deactivated. For example, the UE may be configured with 2 active BWPs (e.g., BWP 1 and BWP 2). Neither of these BWPs is the initial BWP. Once BWP 1 is deactivated according to the expiry of its timer, the UE may be configured to activate the initial BWP even though there is already another active BWP (e.g., BWP 2). Then, when the timer corresponding to BWP 2 is also expired, the UE may deactivate BWP 2. Since the initial BWP is already active, the UE is not expected to activate any other BWP.

In some implementations, the total occupied frequency range of active BWPs may be constrained. The restriction may comprise an allowed frequency range. The UE may be configured to determine whether a total occupied frequency range of the plurality of BWPs is greater than the allowed frequency range. The UE may be configured to deactivate at least one of the plurality of BWPs in an event that the total occupied frequency range is greater than the allowed frequency range. Specifically, the total occupied frequency range of all active BWPs in a serving cell may not be wider than a maximum allowed bandwidth (e.g., B). For example, $f_{n,L}$ may be configured as the lower threshold of active BWP n (i.e., lowest position in frequency). $f_{n,U}$ may be configured as the upper threshold of active BWP n (i.e., highest position in frequency). The UE may be configured to whether the maximum allowed bandwidth (e.g., B) is greater than or equal to the range of $[\min(f_{0,L}, f_{1,L}, \ldots, f_{N,L}), \max(f_{0,U}, f_{1,U}, \ldots, f_{N,U})]$. In an event that the result is true, the UE may be configured to activate all BWP 0, BWP 1 ... BWP N. In an event that the result is false, the UE may be configured not to activate any BWP. Alternatively, for each of n=0, N, the UE may be configured to determine whether the maximum allowed bandwidth (e.g., B) is greater than or equal to the range of $[\min(f_{0,L}, f_{1,L}, \ldots, f_{n,L}), \max(f_{0,U}, f_{1,U}, \ldots, f_{n,U})]$. In an event that the result is true, the UE may be configured to activate BWP n and increase n by 1. In an event that the result is false, the UE may be configured not to activate BWP n and stop further determination.

The maximum allowed bandwidth B may be defined as a fixed value in 3GPP specifications. Alternatively, the maximum allowed bandwidth B may be configurable via a higher layer signaling (e.g., RRC signaling) and/or a physical layer signaling (e.g., DCI) from the network node. Alternatively, the maximum allowed bandwidth B may be configured depending on UE capability. The UE may signal its capability to the network node (e.g., during initial access). On the other hand, the maximum allowed bandwidth B may be configured per UE, per serving cell, or per frequency band.

Figure 6:
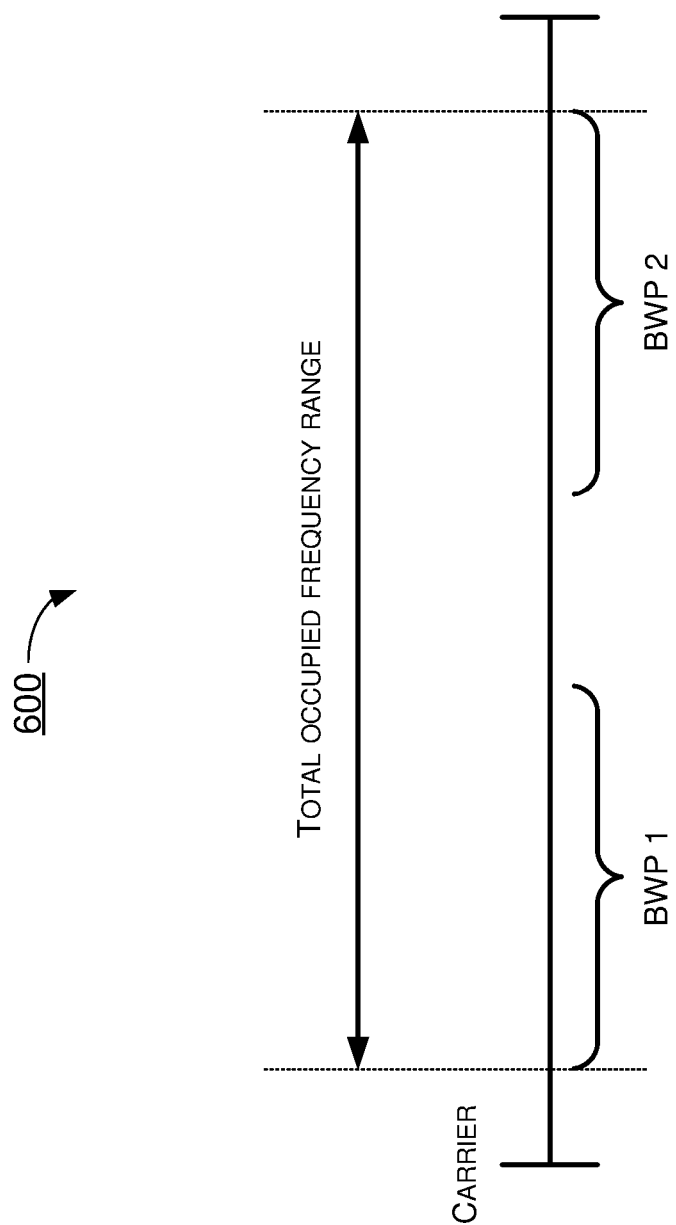
FIG. 6 is a diagram depicting an example scenario under schemes in accordance with implementations of the present disclosure.
Figure 7:
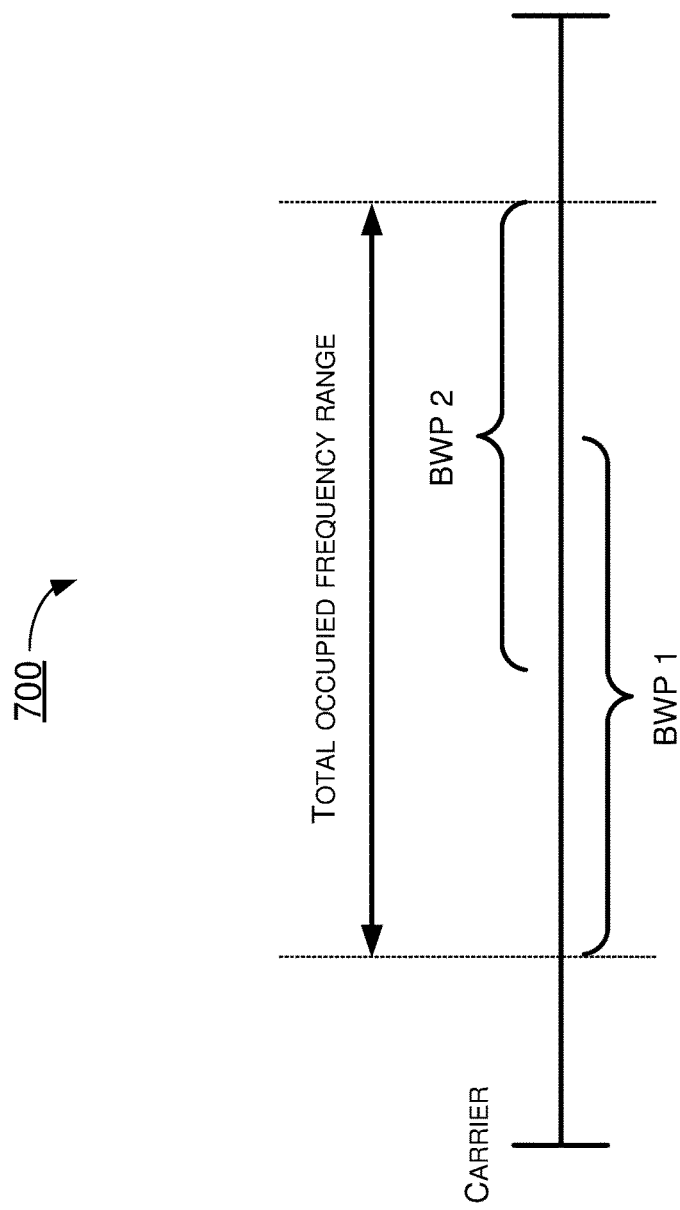
FIG. 7 is a diagram depicting an example scenario under schemes in accordance with implementations of the present disclosure.

The total occupied frequency range of active BWPs may be determined according to the above mentioned scenarios. FIG. 6 illustrates an example scenario 600 under schemes in accordance with implementations of the present disclosure. Scenario 600 may be an example for determining the total occupied frequency range of active BWPs based on scenario 100. As illustrated in scenario 600, BWP 1 is not overlapped with BWP 2 in frequency domain. The total occupied frequency range of BWP 1 and BWP 2 may be determined from the lower frequency position of BWP 1 to the highest frequency position of BWP 2 including the non-overlapping frequency region. FIG. 7 illustrates an example scenario 700 under schemes in accordance with implementations of the present disclosure. Scenario 700 may be an example for determining the total occupied frequency range of active BWPs based on scenario 302. As illustrated in scenario 700, BWP 1 and BWP 2 are partially overlapped in frequency domain. The total occupied frequency range of BWP 1 and BWP 2 may be determined from the lower frequency position of BWP 1 to the highest frequency position of BWP 2.

In some implementations, the total occupied frequency range of all active BWPs in a serving cell may not contain more than some maximum allowed number of physical resource blocks (e.g., R). The determination of R may be based on either the smallest or the greatest numerology in an event that the active BWPs are associated with different numerologies. Alternatively, the determination of R may be based on different numerologies for each active BWP. For example, for the overlapping region of multiple BWPs (e.g., scenario 200, 301 and 302), either the smallest or the greatest numerology among all BWPs may be used as reference. For the unused region between two active BWPs (e.g., scenario 100), there may be two alternatives ways. First, either the smallest or the greatest numerology among all BWPs may be used as reference. Second, always a predefined numerology may be used (e.g., minimum supported numerology). Regarding the configuration of R, the parameter R may be defined as a fixed value in 3GPP specifications. Alternatively, the parameter R may be configurable via a higher layer signaling (e.g., RRC signaling) and/or a physical layer signaling (e.g., DCI) from the network node. Alternatively, the parameter R may be configured depending on UE capability. The UE may signal its capability to the network node (e.g., during initial access). On the other hand, the parameter R may be configured per UE, per serving cell, or per frequency band.

Illustrative Implementations

Figure 8:
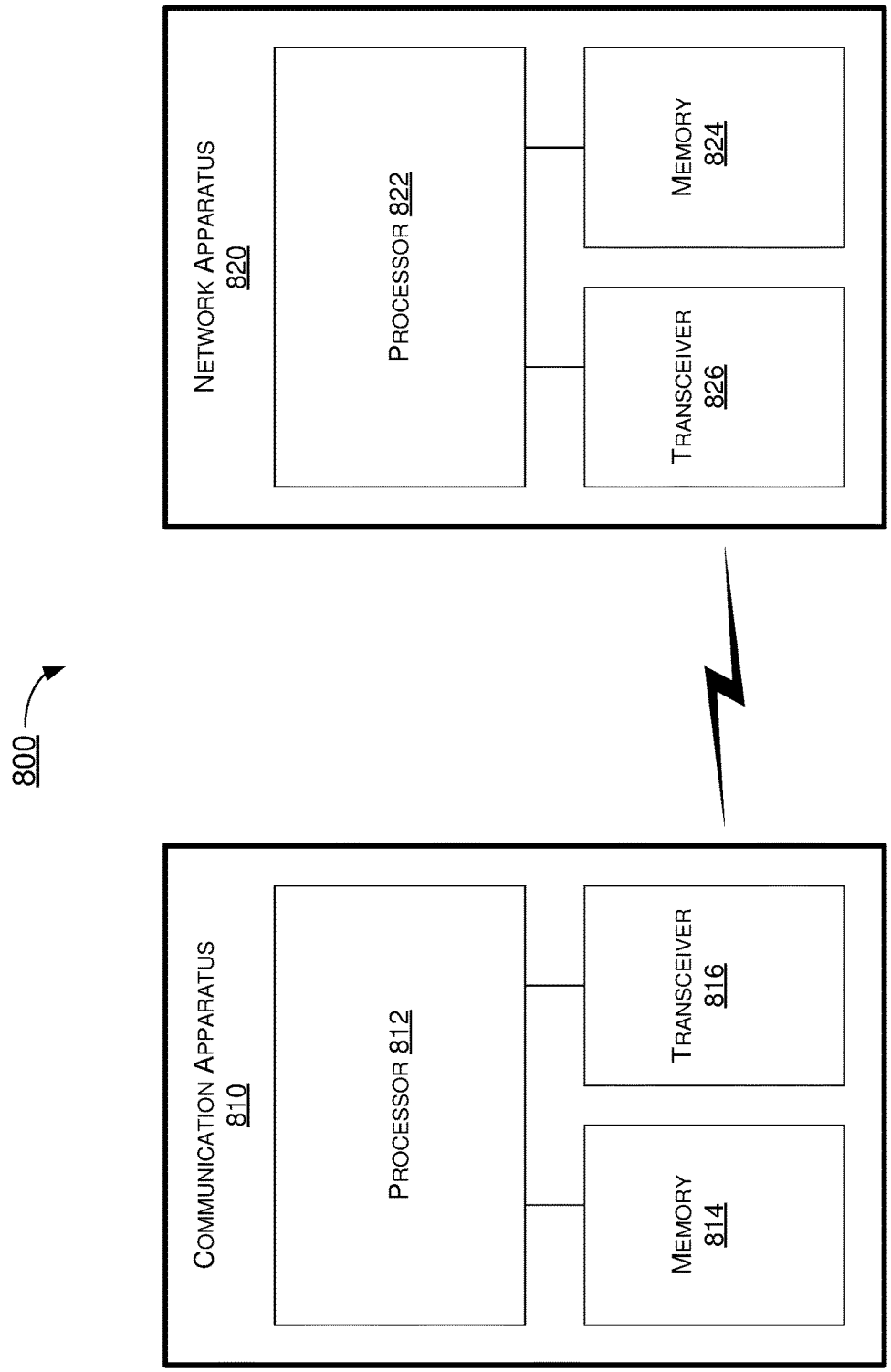
FIG. 8 is a block diagram of an example communication apparatus and an example network apparatus in accordance with an implementation of the present disclosure.

FIG. 8 illustrates an example communication apparatus 810 and an example network apparatus 820 in accordance with an implementation of the present disclosure. Each of communication apparatus 810 and network apparatus 820 may perform various functions to implement schemes, techniques, processes and methods described herein pertaining to multiple active BWPs operation with respect to user equipment and network apparatus in wireless communications, including scenarios 100, 200, 301, 302, 400, 500, 600 and 700 described above as well as process 900 described below.

Communication apparatus 810 may be a part of an electronic apparatus, which may be a UE such as a portable or mobile apparatus, a wearable apparatus, a wireless communication apparatus or a computing apparatus. For instance, communication apparatus 810 may be implemented in a smartphone, a smartwatch, a personal digital assistant, a digital camera, or a computing equipment such as a tablet computer, a laptop computer or a notebook computer. Communication apparatus 810 may also be a part of a machine type apparatus, which may be an IoT or NB-IoT apparatus such as an immobile or a stationary apparatus, a home apparatus, a wire communication apparatus or a computing apparatus. For instance, communication apparatus 810 may be implemented in a smart thermostat, a smart fridge, a smart door lock, a wireless speaker or a home control center. Alternatively, communication apparatus 810 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 810 may include at least some of those components shown in FIG. 8 such as a processor 812, for example. Communication apparatus 810 may further include one or more other components not pertinent to the proposed scheme of the present disclosure (e.g., internal power supply, display device and/or user interface device), and, thus, such component(s) of communication apparatus 810 are neither shown in FIG. 8 nor described below in the interest of simplicity and brevity.

Network apparatus 820 may be a part of an electronic apparatus, which may be a network node such as a base station, a small cell, a router or a gateway. For instance, network apparatus 820 may be implemented in an eNodeB in an LTE, LTE-Advanced or LTE-Advanced Pro network or in a gNB in a 5G, NR, IoT or NB-IoT network. Alternatively, network apparatus 820 may be implemented in the form of one or more IC chips such as, for example and without limitation, one or more single-core processors, one or more multi-core processors, or one or more RISC or CISC processors. Network apparatus 820 may include at least some of those components shown in FIG. 8 such as a processor 822, for example. Network apparatus 820 may further include one or more other components not pertinent to the proposed scheme of the present disclosure (e.g., internal power supply, display device and/or user interface device), and, thus, such component(s) of network apparatus 820 are neither shown in FIG. 8 nor described below in the interest of simplicity and brevity.

In one aspect, each of processor 812 and processor 822 may be implemented in the form of one or more single-core processors, one or more multi-core processors, or one or more RISC or CISC processors. That is, even though a singular term "a processor" is used herein to refer to processor 812 and processor 822, each of processor 812 and processor 822 may include multiple processors in some implementations and a single processor in other implementations in accordance with the present disclosure. In another aspect, each of processor 812 and processor 822 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 812 and processor 822 is a special-purpose machine specifically designed, arranged and configured to perform specific tasks including power consumption reduction in a device (e.g., as represented by communication apparatus 810) and a network (e.g., as represented by network apparatus 820) in accordance with various implementations of the present disclosure.

In some implementations, communication apparatus 810 may also include a transceiver 816 coupled to processor 812 and capable of wirelessly transmitting and receiving data. In some implementations, communication apparatus 810 may further include a memory 814 coupled to processor 812 and capable of being accessed by processor 812 and storing data therein. In some implementations, network apparatus 820 may also include a transceiver 826 coupled to processor 822 and capable of wirelessly transmitting and receiving data. In some implementations, network apparatus 820 may further include a memory 824 coupled to processor 822 and capable of being accessed by processor 822 and storing data therein. Accordingly, communication apparatus 810 and network apparatus 820 may wirelessly communicate with each other via transceiver 816 and transceiver 826, respectively. To aid better understanding, the following description of the operations, functionalities and capabilities of each of communication apparatus 810 and network apparatus 820 is provided in the context of a mobile communication environment in which communication apparatus 810 is implemented in or as a communication apparatus or a UE and network apparatus 820 is implemented in or as a network node of a communication network.

In some implementations, processor 812 may be configured to receive, via transceiver 816, a configuration of a plurality of BWPs. The configuration may be received from network apparatus 820. Processor 812 may determine whether a restriction is configured. Processor 812 may be configured to activate the plurality of BWPs on a same carrier according to the restriction. Processor 812 may perform, via transceiver 816, a transmission or reception on at least one of a plurality of activated BWPs. The restriction may be specified in 3GPP specifications, pre-stored in memory 814, or configured via a higher layer signaling (e.g., RRC signaling) and/or a physical layer signaling (e.g., DCI) from network apparatus 820.

In some implementations, the restriction may comprise a restricted number of active BWPs. Processor 812 may be configured to activate the restricted number of the plurality of BWPs. Specifically, an integer-valued maximum number of active BWPs may be defined as the restricted number of active BWPs for network apparatus 820. Processor 812 may be not expected to be configured with more than the restricted number (e.g., X number) of active BWPs per cell. Processor 812 may be configured to activate up to a limited X number of active BWPs. The integer-valued X may be a fixed value (e.g., X=2), or may be determined based on a capability of communication apparatus 810. Either of these options may be applicable to all carriers or, alternatively, either of the options may be defined specifically for some of the carriers. For example, processor 812 may be configured to activate 1 BWP when operating in FR1 bands and activate 2 BWPs when operating in FR2 bands.

In some implementations, the restriction may comprise a restricted carrier. The restricted carrier may comprise at least one of an uplink carrier, a downlink carrier, a supplementary uplink carrier, and a supplementary downlink carrier. Processor 812 may be configured to activate the plurality of BWPs in the restricted carrier. Specifically, multiple active BWPs may be configured for only downlink or for only uplink. For example, in an event that there is a SUL configured in uplink, processor 812 may be configured with multiple active BWPs only for downlink. Processor 812 is not expected to be configured with more than X number of active downlink BWPs per cell. In another example, processor 812 may be configured with multiple active BWPs only in uplink for reliable cell-edge operation. In addition, the configuration of downlink-only multiple active BWPs or uplink-only multiple active BWPs may be determined according to a capability of communication apparatus 810. Processor 812 may report its capability for supporting downlink-only multiple active BWPs and/or uplink-only multiple active BWPs. Processor 812 may be configured to transmit, via transceiver 816, a capability signalling to network apparatus 820 during the initial access procedure.

In some implementations, the restriction may comprise that mixed numerologies among BWPs are not allowed. Processor 812 may be configured to activate no BWPs. Specifically, the configuration of multiple BWPs with mixed numerologies may be not allowed in an event that multiple BWPs are non-overlapping in frequency. Processor 812 may be configured to determine whether the numerologies of different BWPs are different. In an event that the mixed numerologies between multiple BWPs are detected processor 812, processor 812 may be configured not to activate the multiple BWPs or activate only one of the multiple BWPs. Alternatively, processor 812 may be configured to report its capability for not supporting mixed numerologies. In an event that mixed numerologies among BWPs is configured, processor 812 may be configured to ignore the configuration.

In some implementations, the restriction may comprise that mixed numerologies among BWPs are allowed with a limitation. Processor 812 may be configured to activate the plurality of BWPs according to the limitation. Specifically, the limitation may comprise that only certain combinations of different numerologies can be supported. For example, only multiple numerologies with one degree of difference may be supported. Processor 812 may be configured to activate the plurality of BWPs with one degree of difference in numerologies.

In some implementations, support for different numerologies between simultaneously active BWPs may depend on the capability of communication apparatus 810. Processor 812 may be configured to determine whether to activate the plurality of BWPs according to its capability. For example, any combination of different numerologies may not be supported as a capability. Only some combinations of different numerologies may be supported. Processor 812 may be configured to report its capability for supporting specific combinations of different numerologies.

In some implementations, the restriction may comprise that no simultaneous transmission or reception on the plurality of BWPs is allowed. Processor 812 may be configured to perform the transmission or reception on one of a plurality of activated BWPs. For example, no simultaneous transmission/reception may be expected on different uplink/downlink BWPs from processor 812. Processor 812 may be configured to perform transmission/reception on one of the plurality of active BWPs.

In some implementations, processor 812 may be configured to determine whether the switching duration from a first BWP to a second BWP is not shorter than a guard period. After determining that the switching duration is not shorter than the guard period, processor 812 may be configured to perform a switch from the first BWP to the second BWP. Processor 812 may determine the guard period based on its capability. Processor 812 may be configured to report its capability for the supported guard period.

In some implementations, processor 812 may be configured to initiate an inactivity timer associated with at least one of the plurality of BWPs. Processor 812 may be configured to deactivate at least one of the plurality of BWPs when the inactivity timer is expired. Specifically, a BWP may be associated with a BWP inactivity timer. One of the active BWPs may be determined as a primary BWP with an inactivity timer whereas the other BWPs may not be assigned a timer. When the timer is expired, all of the active BWPs may be deactivated and processor 812 may switch to the initial BWP. For example, processor 812 may be configured with two active BWPs (e.g., BWP 1 and BWP 2). BWP 1 may be assigned an inactivity timer (i.e., BWP 1 may be considered as the primary BWP). In an event that there is no transmission or reception on BWP 1 for a period of time, processor 812 may initiate the inactivity timer and deactivate both BWPs and activate the initial BWP. In another example, processor 812 may be configured not to transmit or receive data on all active BWPs other than the primary BWP (e.g., the BWP which is assigned an inactivity timer). When the inactivity timer is expired, processor 812 may only perform the transmission/reception on the primary BWP.

In some implementations, processor 812 may initiate a different BWP inactivity timer for each of the active BWP. When one of the inactivity timers is expired, processor 812 may deactivate the corresponding active BWP and then activate the initial BWP. Specifically, processor 812 may be configured to activate the initial BWP only when there are no other active BWPs. For example, processor 812 may be configured with 2 active BWPs (e.g., BWP 1 and BWP 2). Neither of these BWPs is the initial BWP. When BWP 1 is deactivated according to the expiry of its timer, processor 812 is not expected to activate the initial BWP since another BWP (e.g., BWP 2) is still active. Then, when the timer corresponding to BWP 2 is also expired, processor 812 may deactivate BWP 2. Since no other active BWP is left, processor 812 may be configured to activate the initial BWP. Alternatively, processor 812 may be configured to activate the initial BWP as long as at least one of the active BWPs is deactivated. For example, processor 812 may be configured with 2 active BWPs (e.g., BWP 1 and BWP 2). Neither of these BWPs is the initial BWP. Once BWP 1 is deactivated according to the expiry of its timer, processor 812 may be configured to activate the initial BWP even though there is already another active BWP (e.g., BWP 2). Then, when the timer corresponding to BWP 2 is also expired, processor 812 may deactivate BWP 2. Since the initial BWP is already active, processor 812 is not expected to activate any other BWP.

In some implementations, processor 812 may be configured to determine whether a total occupied frequency range of the plurality of BWPs is greater than an allowed frequency range. Processor 812 may be configured to deactivate at least one of the plurality of BWPs in an event that the total occupied frequency range is greater than the allowed frequency range. Specifically, the total occupied frequency range of all active BWPs in a serving cell may not be wider than a maximum allowed bandwidth (e.g., B). For example, processor 812 may be configured to whether the maximum allowed bandwidth (e.g., B) is greater than or equal to the range of $[\min(f_{0,L}, f_{1,L}, \ldots, f_{N,L}), \max(f_{0,U}, f_{1,U}, \ldots, f_{N,U})]$. In an event that the result is true, processor 812 may be configured to activate all BWP 0, BWP 1 . . . BWP N. In an event that the result is false, processor 812 may be configured not to activate any BWP. Alternatively, for each of n= 0, . . . , N, processor 812 may be configured to determine whether the maximum allowed bandwidth (e.g., B) is greater than or equal to the range of $[\min(f_{0,L}, f_{1,L}, \ldots, f_{n,L}), \max(f_{0,U}, f_{1,U}, \ldots, f_{n,U})]$. In an event that the result is true, processor 812 may be configured to activate BWP n and increase n by 1. In an event that the result is false, processor 812 may be configured not to activate BWP n and stop further determination.

Illustrative Processes

Figure 9:
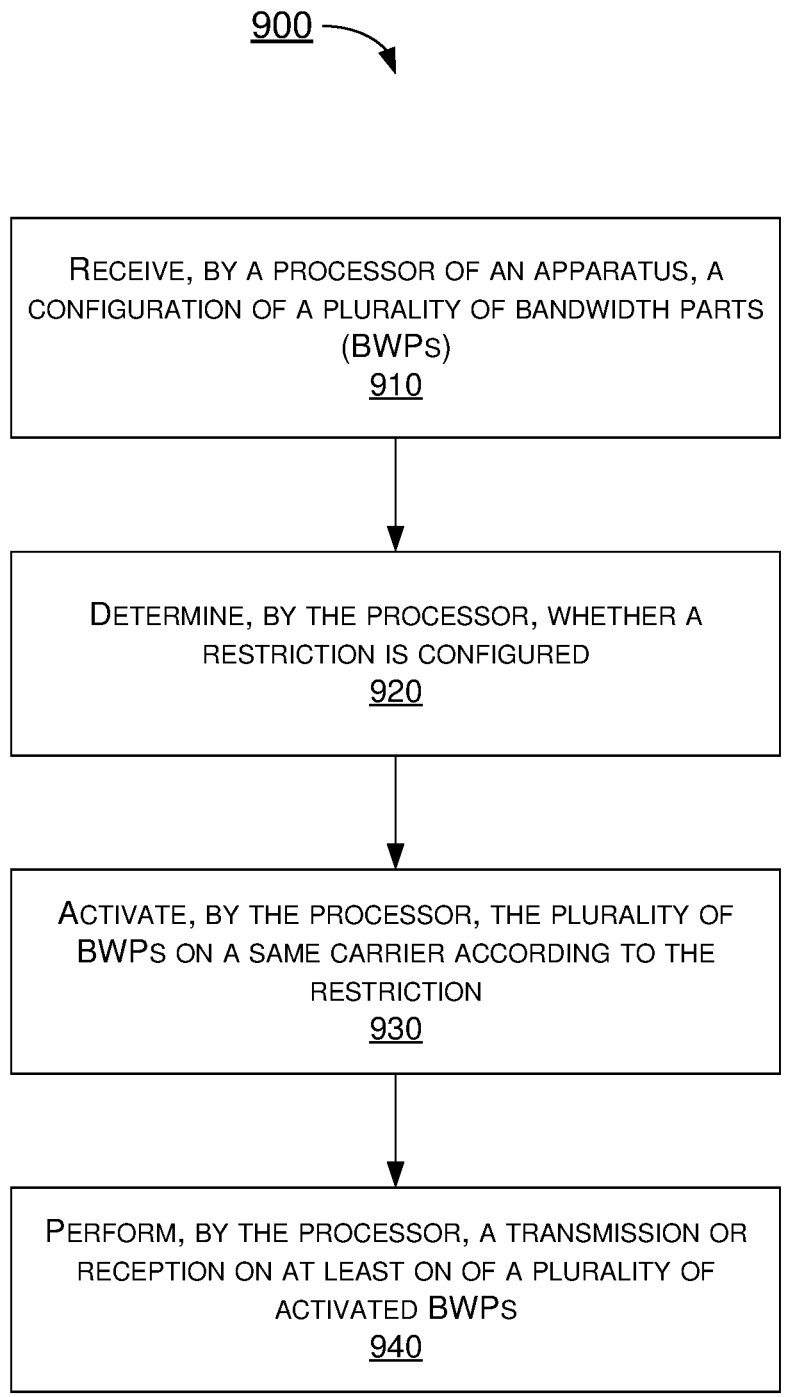
FIG. 9 is a flowchart of an example process in accordance with an implementation of the present disclosure.

FIG. 9 illustrates an example process 900 in accordance with an implementation of the present disclosure. Process 900 may be an example implementation of scenarios 100, 200, 301, 302, 400, 500, 600 and 700, whether partially or completely, with respect to multiple active BWPs operation with the present disclosure. Process 900 may represent an aspect of implementation of features of communication apparatus 810. Process 900 may include one or more operations, actions, or functions as illustrated by one or more of blocks 910, 920, 930 and 940. Although illustrated as discrete blocks, various blocks of process 900 may be divided into additional blocks, combined into fewer blocks, or eliminated, depending on the desired implementation. Moreover, the blocks of process 900 may executed in the order shown in FIG. 9 or, alternatively, in a different order.

Process 900 may be implemented by communication apparatus 810 or any suitable UE or machine type devices. Solely for illustrative purposes and without limitation, process 900 is described below in the context of communication apparatus 810. Process 900 may begin at block 910.

At 910, process 900 may involve processor 812 of apparatus 810 receiving a configuration of a plurality of BWPs. Process 900 may proceed from 910 to 920.

At 920, process 900 may involve processor 812 determining whether a restriction is configured. Process 900 may proceed from 920 to 930.

At 930, process 900 may involve processor 812 activating the plurality of BWPs on a same carrier according to the restriction. Process 900 may proceed from 930 to 940.

At 940, process 900 may involve processor 812 performing a transmission or reception on at least one of a plurality of activated BWPs.

In some implementations, the restriction may comprise a restricted number of active BWPs among the plurality of BWPs. Process 900 may involve processor 812 activating the restricted number of the active BWPs.

In some implementations, the restriction may comprise a restricted carrier. Process 900 may involve processor 812 activating the plurality of BWPs in the restricted carrier. The restricted carrier may comprise at least one of an uplink carrier, a downlink carrier, a supplementary uplink carrier, and a supplementary downlink carrier.

In some implementations, the restriction may comprise that mixed numerologies among BWPs are not allowed. Process 900 may involve processor 812 activating no BWPs.

In some implementations, the restriction may comprise that mixed numerologies among BWPs are allowed with a limitation. Process 900 may involve processor 812 activating the plurality of BWPs according to the limitation.

In some implementations, process 900 may involve processor 812 determining whether to activate the plurality of BWPs according to a capability.

In some implementations, the restriction may comprise that no simultaneous transmission or reception on the plurality of BWPs is allowed. Process 900 may involve processor 812 performing the transmission or reception on one of a plurality of activated BWPs.

In some implementations, the process 900 may involve processor 812 determining whether a switching duration from a first BWP to a second BWP is not shorter than a guard period. The process 900 may further involve processor 812 performing a switch from the first BWP to the second BWP in an event that the switching duration is not shorter than the guard period.

In some implementations, process 900 may involve processor 812 initiating an inactivity timer associated with at least one of the plurality of BWPs. Process 900 may further involve processor 812 deactivating at least one of the plurality of BWPs when the inactivity timer is expired.

In some implementations, the restriction may comprise the allowed frequency range. Process 900 may involve processor 812 determining whether a total occupied frequency range of the plurality of BWPs is greater than an allowed frequency range. Process 900 may further involve processor 812 deactivating at least one of the plurality of BWPs in an event that the total occupied frequency range is greater than the allowed frequency range.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   receiving, by a processor of an apparatus, a configuration of a plurality of bandwidth parts (BWPs) on an uplink (UL) or a sidelink (SL);
   determining, by the processor, whether a restriction is met;
   activating, by the processor, the plurality of BWPs on a same carrier according to the restriction; and
   performing, by the processor, a transmission on at least one of a plurality of activated BWPs,
   wherein the transmission on the at least one of the plurality of activated BWPs comprises a transmission on at least one activated BWP on the UL and simultaneously another transmission on at least one activated BWP on the SL, and
   wherein the restriction at least comprises that activated BWPs during a simultaneous pair of transmissions are not allowed to have different numerology configurations.

2. The method of claim 1, wherein the restriction comprises a restricted number of active BWPs among the plurality of BWPs, and wherein the activating comprises activating the restricted number of the active BWPs.

3. The method of claim 1, wherein the restriction comprises a restricted carrier, and wherein the activating comprises activating the plurality of BWPs in the restricted carrier.

4. The method of claim 1, wherein the restriction comprises that mixed numerologies among BWPs are not allowed, and wherein the activating comprises activating no BWPs.

5. The method of claim 1, wherein the restriction comprises that mixed numerologies among BWPs are allowed with a limitation, and wherein the activating comprises activating the plurality of BWPs according to the limitation.

6. The method of claim 1, further comprising:
   determining, by the processor, whether to activate the plurality of BWPs according to a capability.

7. The method of claim 1, wherein the restriction comprises that no simultaneous transmission on the plurality of BWPs is allowed, and wherein the performing comprises performing the transmission on one of the plurality of activated BWPs.

8. The method of claim 1, further comprising:
   determining, by the processor, whether a switching duration from a first BWP to a second BWP is not shorter than a guard period; and
   performing, by the processor, a switch from the first BWP to the second BWP in an event that the switching duration is not shorter than the guard period.

9. The method of claim 1, further comprising:
   initiating, by the processor, an inactivity timer associated with at least one of the plurality of BWPs; and
   deactivating, by the processor, at least one of the plurality of BWPs when the inactivity timer is expired.

10. The method of claim 1, further comprising:
    determining, by the processor, whether a total occupied frequency range of the plurality of BWPs is greater than an allowed frequency range; and
    deactivating, by the processor, at least one of the plurality of BWPs in an event that the total occupied frequency range is greater than the allowed frequency range,
    wherein the restriction comprises the allowed frequency range.

11. An apparatus, comprising:
    a transceiver capable of wirelessly communicating with a network node of a wireless network; and
    a processor communicatively coupled to the transceiver, the processor capable of:
       receiving, via the transceiver, a configuration of a plurality of bandwidth parts (BWPs) on an uplink (UL) or a sidelink (SL);
       determining whether a restriction is met;
       activating the plurality of BWPs on a same carrier according to the restriction; and
       performing, via the transceiver, a transmission on at least one of a plurality of activated BWPs,
    wherein the transmission on the at least one of the plurality of activated BWPs comprises a transmission on at least one activated BWP on the UL and simultaneously another transmission on at least one activated BWP on the SL, and
    wherein the restriction at least comprises that activated BWPs during a simultaneous pair of transmissions are not allowed to have different numerology configurations.

12. The apparatus of claim 11, wherein the restriction comprises a restricted number of active BWPs among the plurality of BWPs, and wherein, in activating the plurality of BWPs according to the restriction, the processor is capable of activating the restricted number of the active BWPs.

13. The apparatus of claim 11, wherein the restriction comprises a restricted carrier, and wherein, in activating the plurality of BWPs according to the restriction, the processor is capable of activating the plurality of BWPs in the restricted carrier.

14. The apparatus of claim 11, wherein the restriction comprises that mixed numerologies among BWPs are not allowed, and wherein, in activating the plurality of BWPs according to the restriction, the processor is capable of activating no BWPs.

15. The apparatus of claim 11, wherein the restriction comprises that mixed numerologies among BWPs are allowed with a limitation, and wherein, in activating the plurality of BWPs according to the restriction, the processor is capable of activating the plurality of BWPs according to the limitation.

16. The apparatus of claim 11, wherein the processor is further capable of:
    determining whether to activate the plurality of BWPs according to a capability.

17. The apparatus of claim 11, wherein the restriction comprises that no simultaneous transmission on the plurality of BWPs is allowed, and wherein, in performing a transmission on at least one of the plurality of activated BWPs, the processor is capable of performing the transmission or reception on one of the plurality of activated BWPs.

18. The apparatus of claim 11, wherein the processor is further capable of:
- determining whether a switching duration from a first BWP to a second BWP is not shorter than a guard period; and
- performing a switch from the first BWP to the second BWP in an event that the switching duration is not shorter than the guard period.

19. The apparatus of claim 11, wherein the processor is further capable of:
- initiating an inactivity timer associated with at least one of the plurality of BWPs; and
- deactivating at least one of the plurality of BWPs when the inactivity timer is expired.

20. The apparatus of claim 11, wherein the processor is further capable of:
- determining whether a total occupied frequency range of the plurality of BWPs is greater than an allowed frequency range; and
- deactivating at least one of the plurality of BWPs in an event that the total occupied frequency range is greater than the allowed frequency range,
- wherein the restriction comprises the allowed frequency range.

* * * * *